United States Patent
Nozato et al.

(10) Patent No.: US 10,113,047 B2
(45) Date of Patent: Oct. 30, 2018

(54) EXFOLIATED GRAPHITE-RESIN COMPOSITE MATERIAL AND METHOD FOR PRODUCING THE SAME

(71) Applicant: SEKISUI CHEMICAL CO., LTD., Osaka, Osaka (JP)

(72) Inventors: Shoji Nozato, Osaka (JP); Akira Nakasuga, Osaka (JP); Hiroshi Yoshitani, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/481,890

(22) Filed: Apr. 7, 2017

(65) Prior Publication Data

US 2017/0210876 A1    Jul. 27, 2017

Related U.S. Application Data

(63) Continuation of application No. 14/412,199, filed as application No. PCT/JP2013/053470 on Feb. 14, 2013, now Pat. No. 9,683,091.

(30) Foreign Application Priority Data

Aug. 27, 2012  (JP) ................................. 2012-186463

(51) Int. Cl.
*C08K 3/04*  (2006.01)
*C08K 7/24*  (2006.01)
(Continued)

(52) U.S. Cl.
CPC .................. *C08K 3/04* (2013.01); *C08F 2/44* (2013.01); *C08F 292/00* (2013.01); *C08K 7/24* (2013.01); *C08L 101/00* (2013.01)

(58) Field of Classification Search
CPC ....................................................... C08K 3/04
See application file for complete search history.

(56) References Cited

U.S. PATENT DOCUMENTS

| 7,659,350 B2 | 2/2010 | Prud'Homme et al. |
| 2009/0036605 A1* | 2/2009 | Ver Meer ............ E21B 33/1208 |
| | | 525/55 |

(Continued)

FOREIGN PATENT DOCUMENTS

| CN | 101287679 A | 10/2008 |
| CN | 102633957 A | 8/2012 |

(Continued)

OTHER PUBLICATIONS

Bowu Zhang, Yujie Zhang, Cheng Peng, Ming Yu, Linfan Li, Bo Deng, Pengfei Hu, Chunhai Fan, Jingye Li and Qing Huang. "Preparation of polymer decorated graphene oxide by g-ray induced graft polymerization" in Nanoscale, 2012, 4, 1742.*

(Continued)

*Primary Examiner* — Michael M Dollinger
*Assistant Examiner* — Christina H Wales
(74) *Attorney, Agent, or Firm* — Cheng Law Group, PLLC

(57) ABSTRACT

There is provided an exfoliated graphite-resin composite material that has high dispersibility in resins and the like and is easily handled. An exfoliated graphite-resin composite material in which exfoliated graphite and a resin form a composite. When an amount of methylene blue adsorbed per g of the exfoliated graphite-resin composite material (μmol/g) is y, the amount of methylene blue adsorbed as measured based on a difference between an absorbance of a methanol solution of methylene blue at a concentration of 10 mg/L and an absorbance of a supernatant liquid obtained by introducing the exfoliated graphite-resin composite material into the methanol solution of methylene blue and performing cen- (Continued)

trifugation, and a BET specific surface area ($m^2/g$) of the exfoliated graphite-resin composite material is x, a ratio y/x is 0.15 or more, and the BET specific surface area is 25 $m^2/g$ or more.

6 Claims, 9 Drawing Sheets

(51) Int. Cl.
*C08F 2/44* (2006.01)
*C08F 292/00* (2006.01)
*C08L 101/00* (2006.01)

(56) References Cited

U.S. PATENT DOCUMENTS

| | | |
|---|---|---|
| 2013/0130049 A1 | 5/2013 | Moilanen et al. |
| 2013/0296498 A1* | 11/2013 | Nakasuga ............... C08F 2/44 525/330.3 |
| 2014/0080950 A1 | 3/2014 | Wada et al. |

FOREIGN PATENT DOCUMENTS

| | | | |
|---|---|---|---|
| GB | 2 109 781 A | 6/1983 | |
| JP | 10-95887 A | 4/1998 | |
| JP | 2009-29677 A | 2/2009 | |
| JP | 2009-511415 A | 3/2009 | |
| JP | 2012-107233 A | 6/2012 | |
| JP | WO 2012105344 A1 * | 8/2012 | ............... C08F 2/44 |
| JP | 2012-250892 A | 12/2012 | |
| JP | 2013-112591 A | 6/2013 | |
| WO | WO-2007/047084 A2 | 4/2007 | |
| WO | WO-2012/105344 A1 | 8/2012 | |

OTHER PUBLICATIONS

International Search Report for the Application No. PCT/JP2013/053470 dated Mar. 12, 2013.
Written Opinion of the International Searching Authority (PCT/ISA/237) for Application No. PCT/JP2013/053470 dated Mar. 12, 2013 (English Translation mailed Mar. 12, 2015).
Zhang, Bowu et al., "Preparation of polymer decorated graphene oxide by gamma ray induced graft polymerization", Nanoscale, 2012, vol. 4, pp. 1742-1748.

* cited by examiner

[FIG. 1]
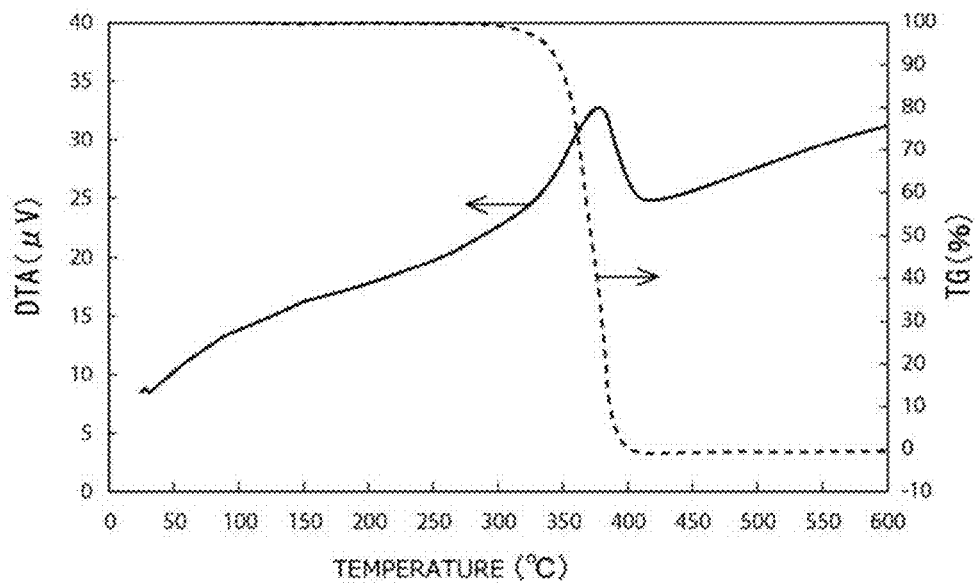
[FIG. 2]
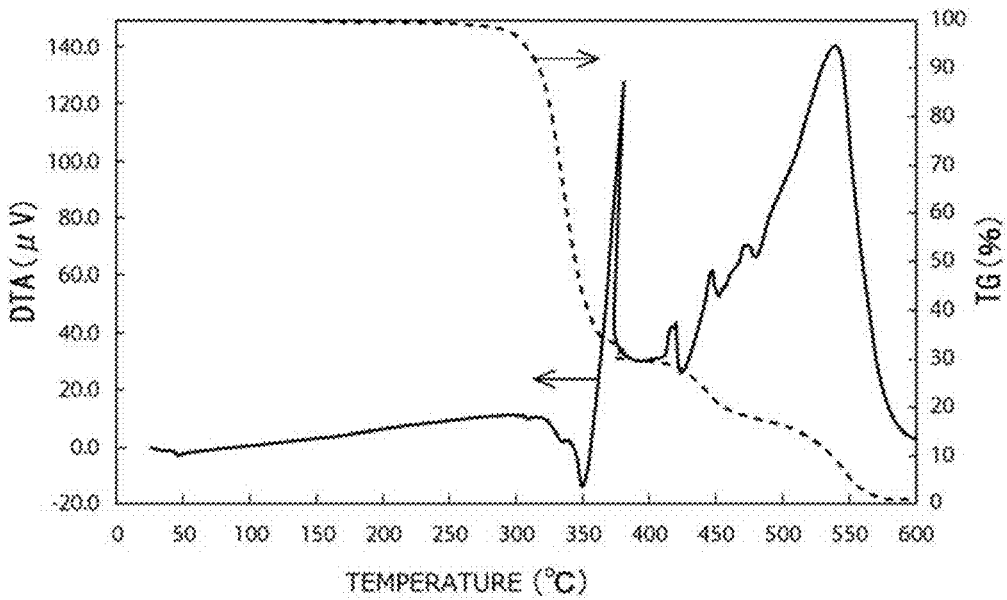

[FIG. 3]
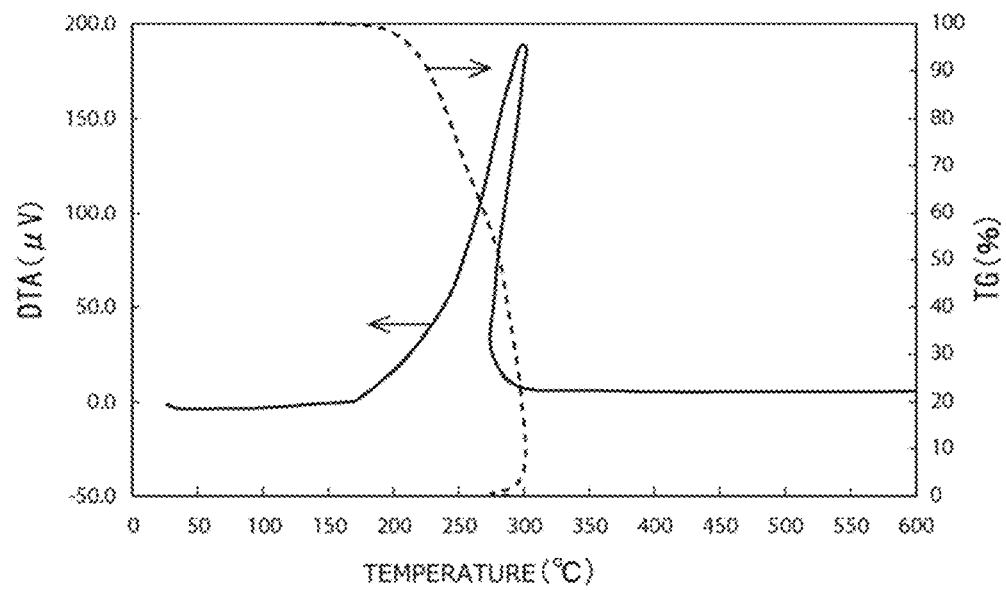
[FIG. 4]
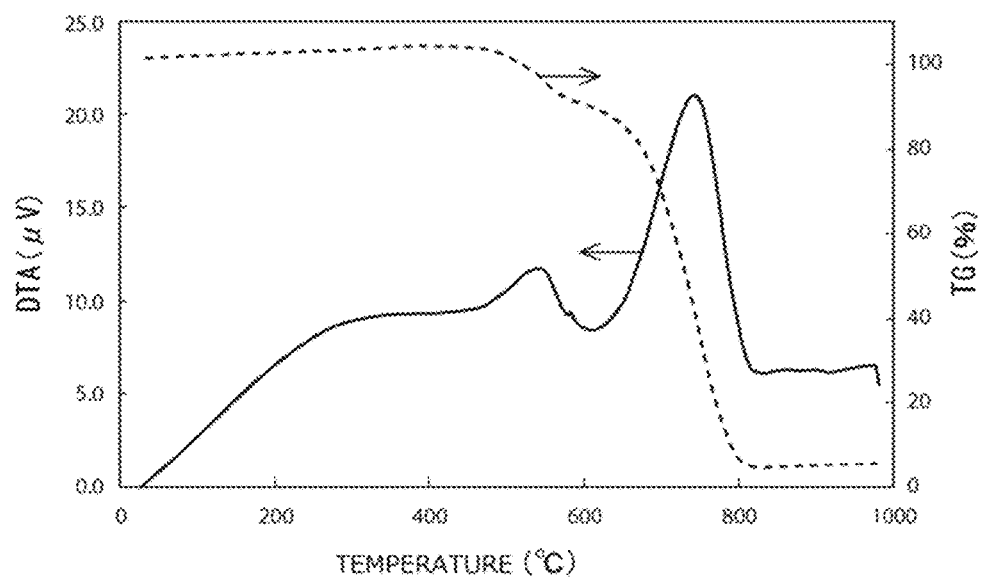

[FIG. 5]
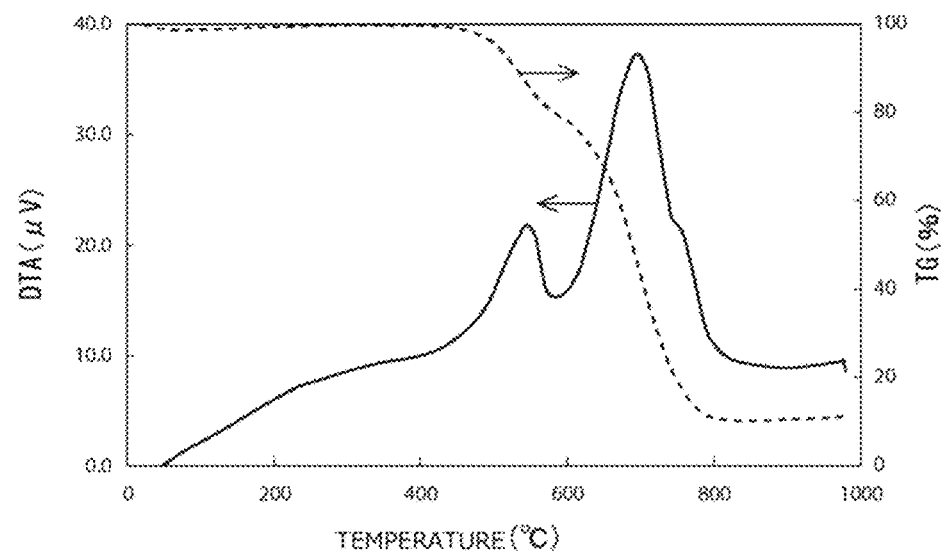
[FIG. 6]
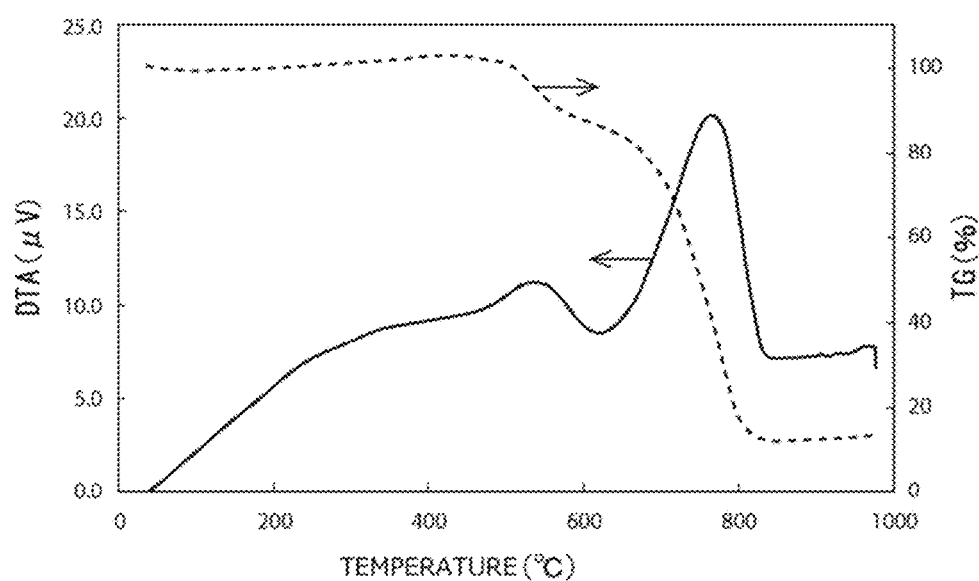

[FIG. 7]
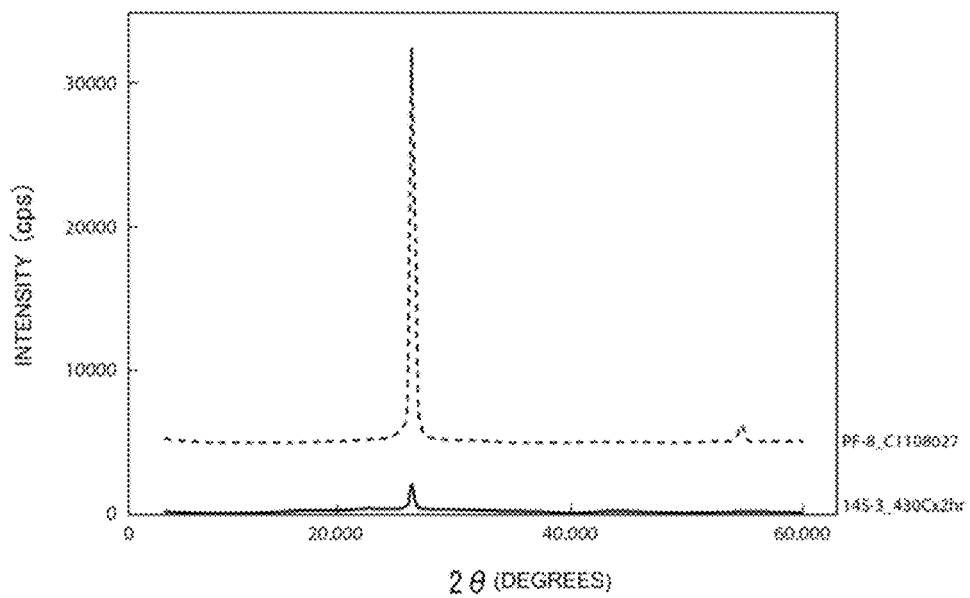
[FIG. 8]
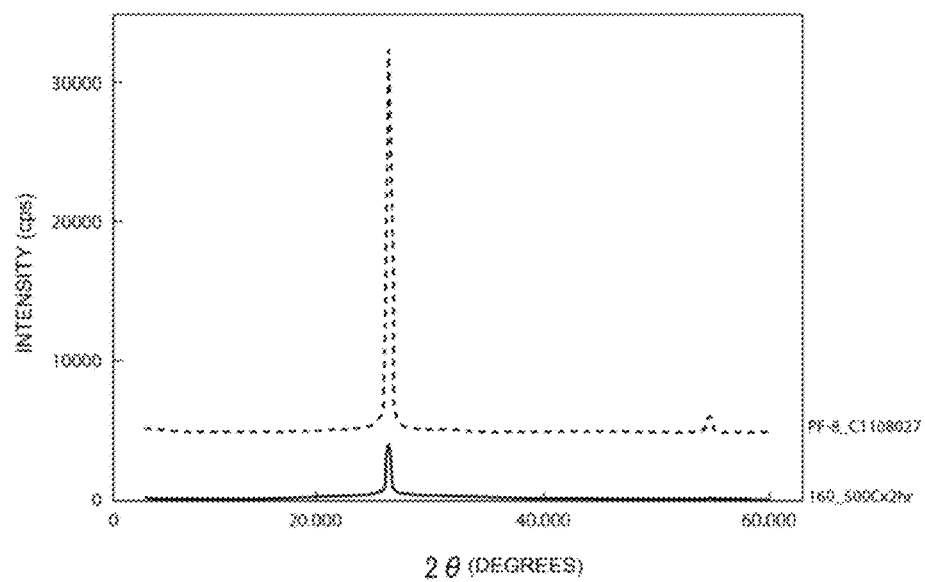

[FIG. 9]
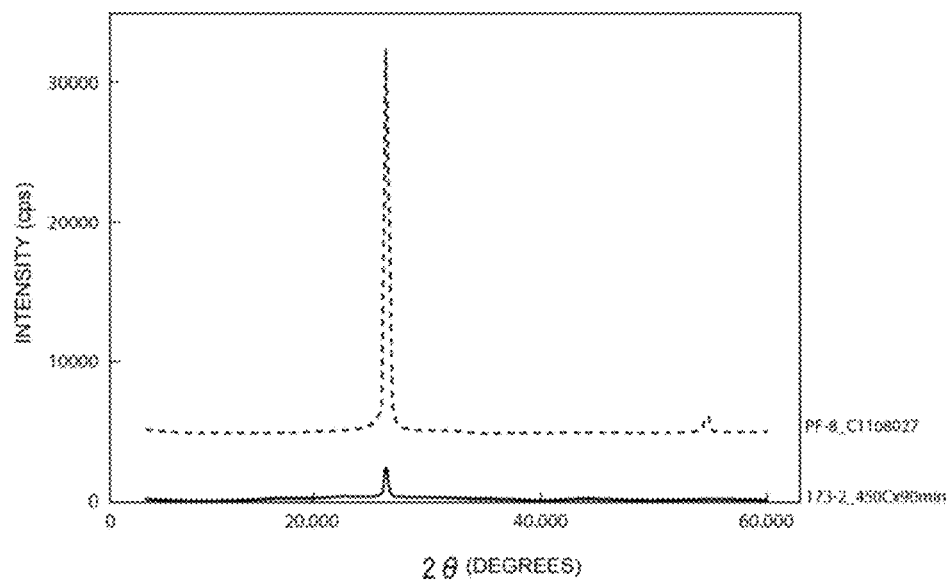
[FIG. 10]
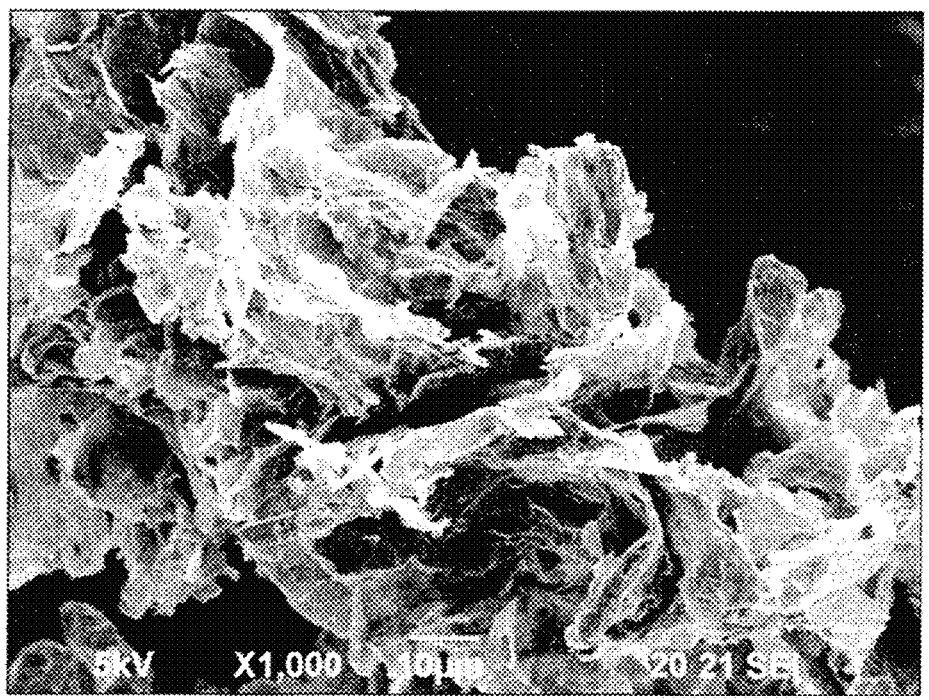

[FIG. 11]
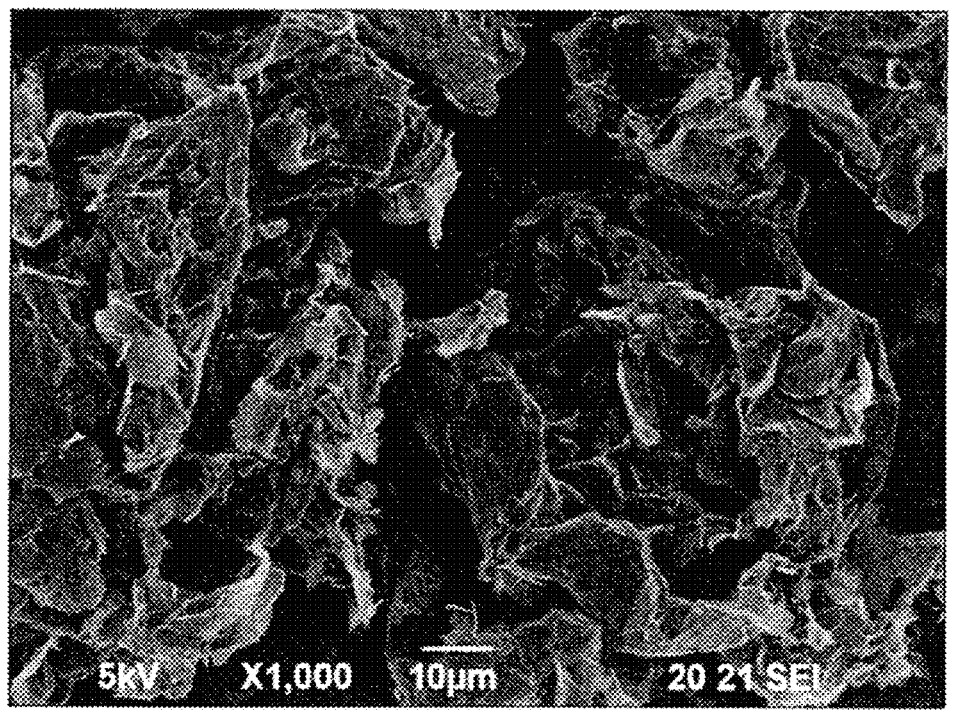
[FIG. 12]
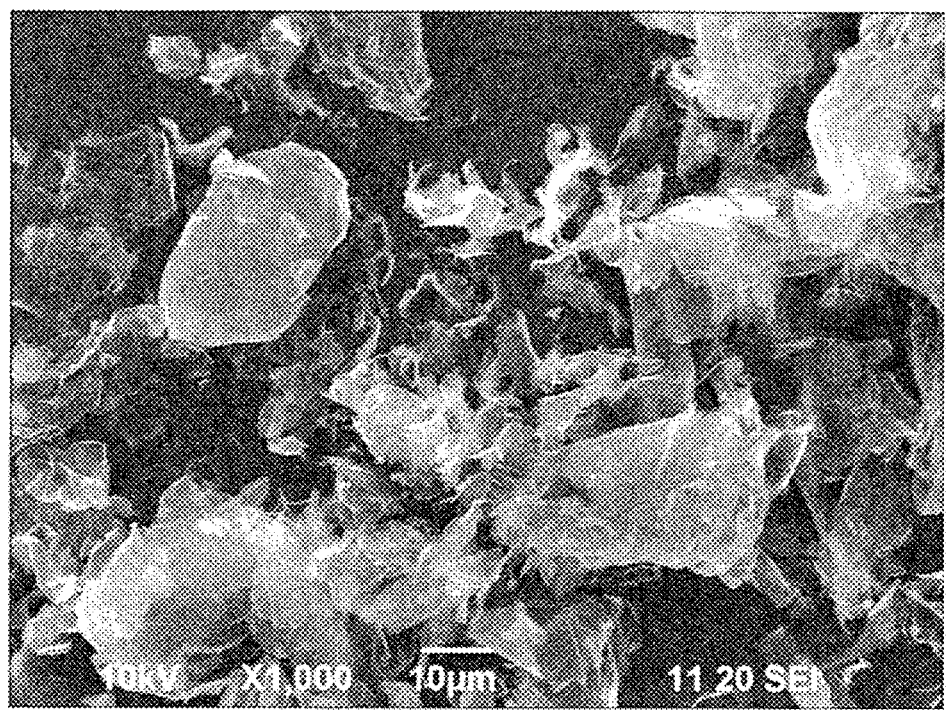

[FIG. 13]
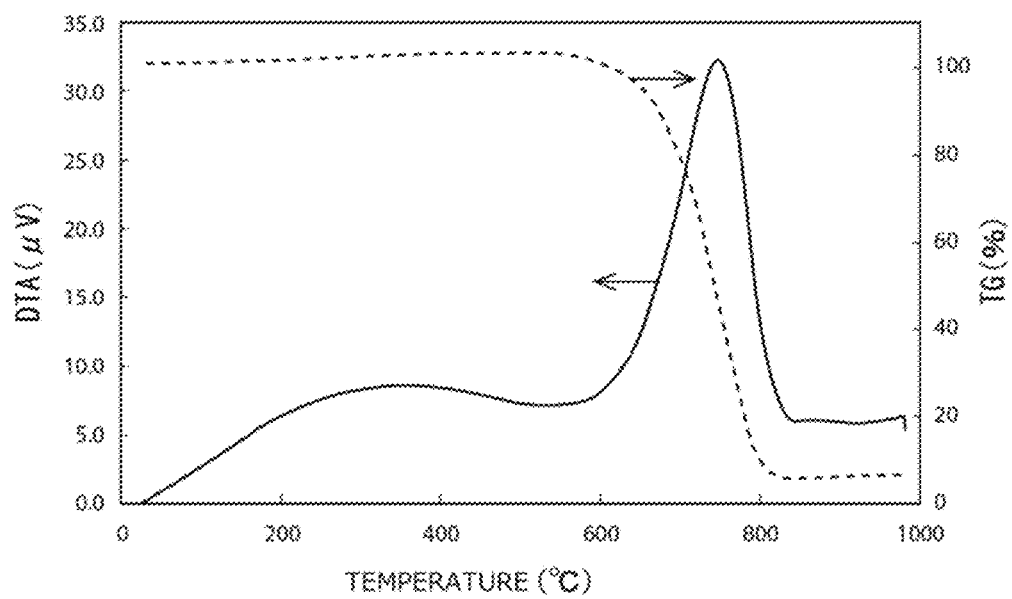
[FIG. 14]
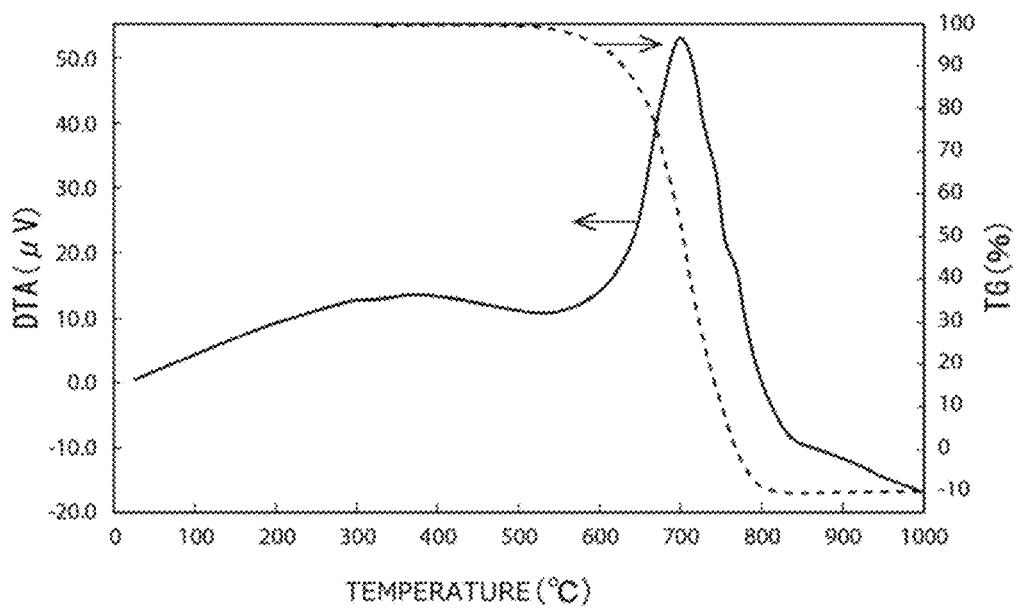

[FIG. 15]
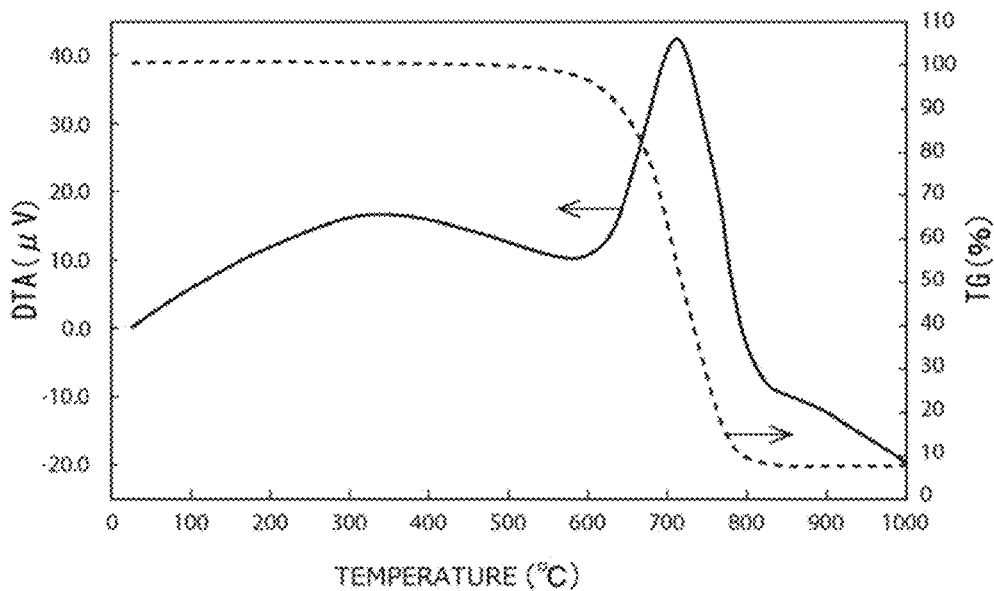
[FIG. 16]
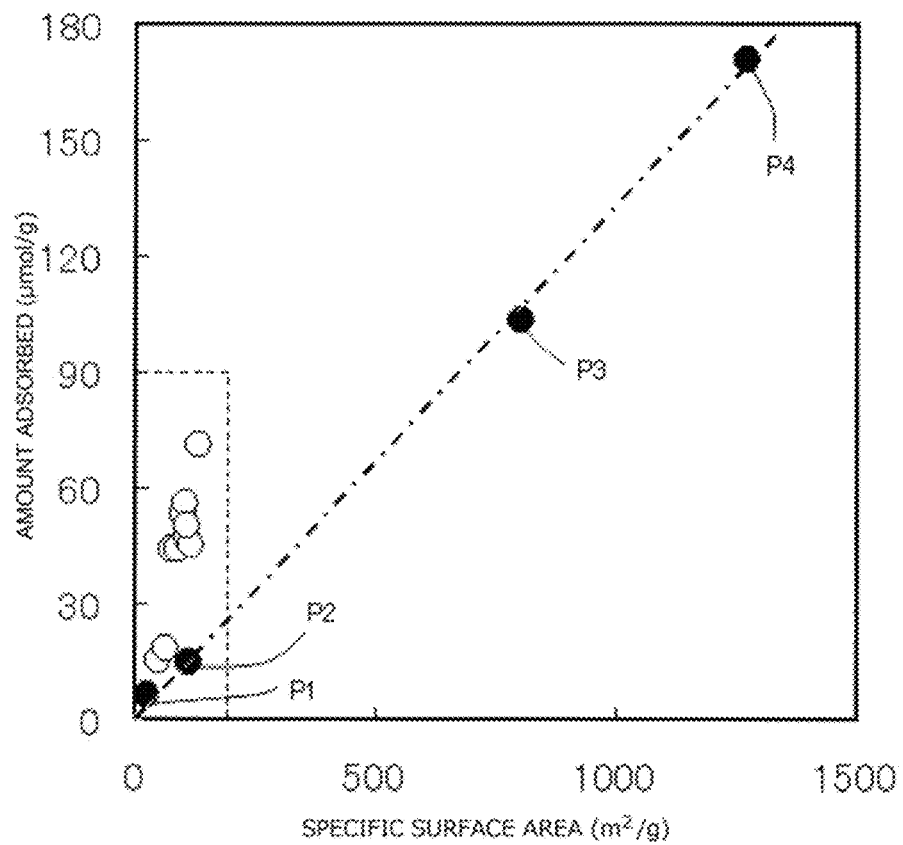

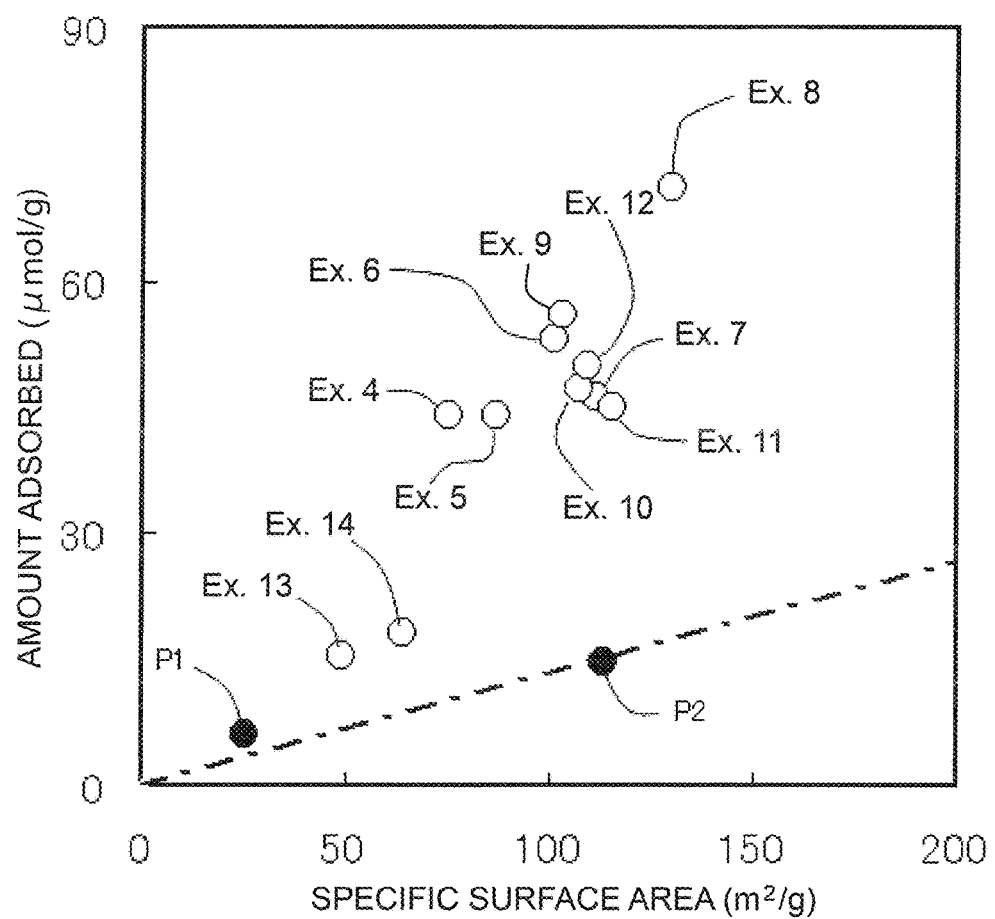

EXFOLIATED GRAPHITE-RESIN COMPOSITE MATERIAL AND METHOD FOR PRODUCING THE SAME

CROSS-REFERENCE TO RELATED APPLICATIONS

This application is a Continuation Application of patent application Ser. No. 14/412,199, filed on Dec. 30, 2014, which is a 371 application of Application Serial No. PCT/JP2013/053470, filed on Feb. 14, 2013, which is based on Japanese Patent Application No. 2012-186463, filed on Aug. 27, 2012, the entire contents of which are hereby incorporated by reference.

TECHNICAL FIELD

The present invention relates to an exfoliated graphite-resin composite material obtained by exfoliating graphite or primary exfoliated graphite, and a method for producing the same.

BACKGROUND ART

Graphite is a stack in which a large number of graphenes are stacked. By exfoliating graphite, graphene or exfoliated graphite having a smaller number of stacked layers of graphene than graphite is obtained. The exfoliated graphite is expected to be applied to electrically conductive materials, thermally conductive materials, and the like.

In recent years, various methods of grafting a polymer on graphene or exfoliated graphite to increase the dispersibility of the graphene or exfoliated graphite in a resin, and the like have been studied. For example, the following Patent Literature 1 discloses a method for producing graphene on which a polymer is grafted, by subjecting exfoliated graphene and a radical polymerizable monomer to polymerization in coexistent state.

CITATION LIST

Patent Literature

Patent Literature 1: U.S. Pat. No. 7,659,350 B2

SUMMARY OF INVENTION

Technical Problem

In the method in Patent Literature 1, graphite is previously exfoliated, and the thus obtained exfoliated graphene is used.

However, in conventionally known methods for exfoliating graphene, it is necessary to treat raw material graphite with an acid, then heat the above graphite to exfoliate the graphite, and further collect the obtained powder of graphene or exfoliated graphite. In this manner, in order to obtain graphene or exfoliated graphite, it is necessary to exfoliate raw material graphite through a large number of complicated steps. In addition, in conventional methods, graphene or exfoliated graphite is obtained as a powder, and therefore, there is the problem of difficult handling.

It is a main object of the present invention to provide an exfoliated graphite-resin composite material that has high dispersibility in resins and the like and is easily handled.

Solution to Problem

An exfoliated graphite-resin composite material according to the present invention is an exfoliated graphite-resin composite material in which exfoliated graphite and a resin form a composite. In an exfoliated graphite-resin composite material according to a first invention in this application, when the amount of methylene blue adsorbed (µmol/g) measured by the following method is y, and the BET specific surface area ($m^2/g$) is x, the ratio y/x is 0.15 or more, and the BET specific surface area is 25 $m^2/g$ or more. The above amount of methylene blue adsorbed is measured based on the difference between the absorbance of a methanol solution of methylene blue at a concentration of 10 mg/L and the absorbance of a supernatant liquid obtained by introducing the exfoliated graphite-resin composite material into the methanol solution of methylene blue, performing stirring, and then performing centrifugation. This method for measuring the amount of methylene blue adsorbed will be described in detail in the subsequent description of embodiments.

An exfoliated graphite-resin composite material according to a second invention in this application is an exfoliated graphite-resin composite material in which exfoliated graphite and a resin form a composite. In the exfoliated graphite-resin composite material, a pyrolysis initiation temperature and pyrolysis end temperature of the resin in the composite material are higher than a pyrolysis initiation temperature and pyrolysis end temperature of the resin before the composite formation, respectively.

In another particular aspect of the exfoliated graphite-resin composite material according to the present invention, a content of the resin is 1% by mass to 70% by mass.

In another particular aspect of the exfoliated graphite-resin composite material according to the present invention, the resin is a polymer of a radical polymerizable monomer.

A method for producing an exfoliated graphite-resin composite material according to the present invention is a method for producing the above exfoliated graphite-resin composite material. In the method for producing an exfoliated graphite-resin composite material according to the present invention, a composition comprising graphite or primary exfoliated graphite and a polymer, the polymer being fixed to the graphite or primary exfoliated graphite, is provided. The polymer contained in the composition is pyrolyzed to exfoliate the graphite or primary exfoliated graphite while leaving part of the polymer.

In a particular aspect of the method for producing an exfoliated graphite-resin composite material according to the present invention, in the step of providing the composition, the polymer is grafted or adsorbed on the graphite or primary exfoliated graphite, and thus, the polymer is fixed to the graphite or primary exfoliated graphite.

In the first embodiment of the method for producing an exfoliated graphite-resin composite material according to the present invention, the step of providing the composition comprises a step of providing a mixture comprising the graphite or primary exfoliated graphite and a radical polymerizable monomer, and a step of polymerizing the radical polymerizable monomer contained in the mixture to form the polymer in which the radical polymerizable monomer is polymerized in the mixture and graft the polymer on the graphite or primary exfoliated graphite.

In the second embodiment of the method for producing an exfoliated graphite-resin composite material according to the present invention, in the step of providing the composition, the polymer is heated to a temperature in a temperature range of 50° C. or higher and 400° C. or lower in the presence of the graphite or primary exfoliated graphite to graft the polymer on the graphite or primary exfoliated graphite.

Various particular aspects of the method for producing an exfoliated graphite-resin composite material according to the present invention, including the above first embodiment or the above second embodiment, will be described below.

In a particular aspect of the method for producing an exfoliated graphite-resin composite material according to the present invention, in the step of providing the composition, the composition further comprises a pyrolyzable foaming agent. In this case, the graphite or primary exfoliated graphite can be exfoliated much more effectively. Therefore, the specific surface area of the obtained exfoliated graphite can be further increased.

In another particular aspect of the method for producing an exfoliated graphite-resin composite material according to the present invention, the pyrolyzable foaming agent is at least one heat foaming agent selected from the group consisting of compounds having structures represented by the following formula (1) to formula (4).

[Formula 1]

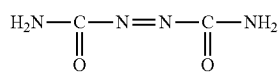

Formula (1)

[Formula 2]

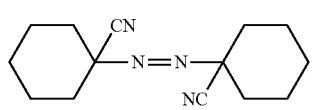

Formula (2)

[Formula 3]

Formula (3)

[Formula 4]

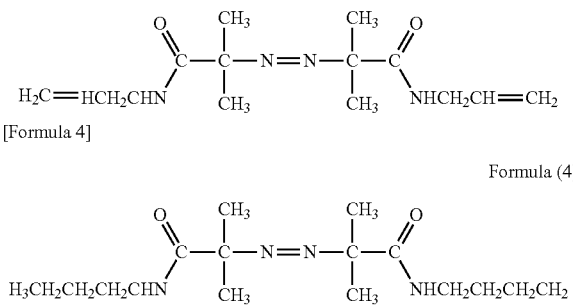

Formula (4)

In another particular aspect of the method for producing an exfoliated graphite-resin composite material according to the present invention, in the step of pyrolyzing the polymer to exfoliate the graphite or primary exfoliated graphite, the pyrolyzable foaming agent contained in the mixture is pyrolyzed.

In still another particular aspect of the above first embodiment of the method for producing an exfoliated graphite-resin composite material according to the present invention, in the step of forming the polymer and grafting the polymer on the graphite or primary exfoliated graphite, the pyrolyzable foaming agent contained in the mixture is pyrolyzed.

In still another particular aspect of the above first embodiment of the method for producing an exfoliated graphite-resin composite material according to the present invention, the step of forming the polymer and grafting the polymer on the graphite or primary exfoliated graphite is performed by heating the mixture to polymerize the radical polymerizable monomer contained in the mixture. In this case, both the polymerization of the radical polymerizable monomer and the polymerization of the polymer can be performed by simply heating the mixture. Therefore, the graphite or primary exfoliated graphite can be exfoliated much more easily.

In still another particular aspect of the method for producing an exfoliated graphite-resin composite material according to the present invention, the radical polymerizable monomer is a vinyl-based monomer. Preferably, the vinyl-based monomer is a styrene monomer or glycidyl methacrylate. The styrene monomer is inexpensive, and therefore, the production cost of the exfoliated graphite-resin composite material can be lowered. In the above-described first embodiment, as the radical polymerizable monomer, the styrene monomer can be preferably used. In addition, in the above-described second embodiment, as the above polymer, a polymer of glycidyl methacrylate is preferably used.

Advantageous Effects of Invention

In the exfoliated graphite-resin composite material according to the present invention, the distance between graphenes is increased, and therefore, the specific surface area is large. In addition, the exfoliated graphite-resin composite material according to the present invention has a graphite structure in the central portion and has an exfoliated structure in which the distance between graphenes is increased in the edge portion. Therefore, the exfoliated graphite-resin composite material is more easily handled than conventional exfoliated alloys. Further, the exfoliated graphite-resin composite material according to the present invention comprises a resin and therefore has high dispersibility in other resins.

BRIEF DESCRIPTION OF DRAWINGS

FIG. 1 is a diagram showing the TG/DATA measurement results of polystyrene in Example 1.

FIG. 2 is a diagram showing the TG/DATA measurement results of polyvinyl acetate in Example 2.

FIG. 3 is a diagram showing the TG/DATA measurement results of polypropylene glycol in Example 3.

FIG. 4 is a diagram showing the TG/DATA measurement results of an exfoliated graphite-resin composite material obtained in Example 1.

FIG. 5 is a diagram showing the TG/DATA measurement results of an exfoliated graphite-resin composite material obtained in Example 2.

FIG. 6 is a diagram showing the TG/DATA measurement results of an exfoliated graphite-resin composite material obtained in Example 3.

FIG. 7 is a diagram showing the XRD spectrum of the exfoliated graphite-resin composite material obtained in Example 1.

FIG. 8 is a diagram showing the XRD spectrum of the exfoliated graphite-resin composite material obtained in Example 2.

FIG. 9 is a diagram showing the XRD spectrum of the exfoliated graphite-resin composite material obtained in Example 3.

FIG. 10 is a photograph of the exfoliated graphite obtained by Example 1 taken by a scanning electron microscope (SEM).

FIG. 11 is a photograph of the exfoliated graphite obtained by Example 2 taken by the scanning electron microscope (SEM).

FIG. 12 is a photograph of the exfoliated graphite obtained by Example 3 taken by the scanning electron microscope (SEM).

FIG. 13 is a diagram showing the TG/DATA measurement results of an exfoliated graphite-resin composite material obtained in Reference Example 1.

FIG. 14 is a diagram showing the TG/DATA measurement results of an exfoliated graphite-resin composite material obtained in Reference Example 2.

FIG. 15 is a diagram showing the TG/DATA measurement results of an exfoliated graphite-resin composite material obtained in Reference Example 3.

FIG. 16 is a diagram showing the relationship between the BET specific surface area ($m^2/g$) and the amount of methylene blue adsorbed (μmol/g) in exfoliated graphite-resin composite materials obtained in Examples 4 to 14 and Reference Examples 4 to 7 and known carbonaceous materials.

FIG. 17 is an enlarged diagram showing the range surrounded by the dotted line in FIG. 16.

DESCRIPTION OF EMBODIMENTS

An exfoliated graphite-resin composite material and a method for producing the same according to the present invention will be described in detail below.

[Exfoliated Graphite-Resin Composite Material]

The exfoliated graphite-resin composite material according to the present invention is a material in which exfoliated graphite and a resin form a composite.

The exfoliated graphite-resin composite material comprises exfoliated graphite and a resin.

The exfoliated graphite contained in the exfoliated graphite-resin composite material is one in which at least a part of graphene layers of graphite or primary exfoliated graphite that is a raw material is exfoliated. Graphite is a stack of a plurality of graphene layers and is, for example, natural graphite, synthetic graphite, or expanded graphite. As the graphite used as a raw material, expanded graphite is preferred. The distance between graphene layers is larger in expanded graphite than in usual graphite, and therefore, the expanded graphite can be easily exfoliated. Therefore, by using expanded graphite as the graphite, the exfoliated graphite-resin composite material can be easily produced.

In the above graphite, the number of stacked layers of graphene is about 100000 or more to 1000000, and the BET specific surface area is a value of 22 $m^2/g$ or less. In addition, the exfoliated graphite-resin composite material of the present invention refers to one in which the number of stacked layers of graphene is 3000 or less.

In an exfoliated graphite-resin composite material according to a first invention in this application, when the amount of methylene blue adsorbed (μmol/g) is y, and the BET specific surface area ($m^2/g$) is x, the ratio y/x is 0.15 or more, more preferably 0.27 or more, and more preferably 0.39 or more.

The above amount of methylene blue adsorbed is obtained by the following method. The exfoliated graphite-resin composite material is introduced into a methanol solution of methylene blue at a concentration of 10 mg/L, and the mixture is stirred. Next, the mixture is centrifuged, and a change in the absorbance of the obtained supernatant liquid at the maximum absorption wavelength is observed. The methylene blue is adsorbed by π conjugation on the portions of the exfoliated graphite-resin composite material where graphene is stacked. On the other hand, the methylene blue emits fluorescence by irradiation with light. When the methylene blue is adsorbed on the graphene, it does not emit fluorescence. In other words, the fluorescence intensity decreases. Therefore, the amount of methylene blue adsorbed can be obtained from the amount of decrease in fluorescence intensity obtained from the above supernatant liquid with respect to the fluorescence intensity of the original methylene blue.

On the other hand, there is a correlation between the above amount of methylene blue adsorbed and the specific surface area of a carbonaceous material. In conventionally known spherical graphite particles, when the specific surface area ($m^2/g$) obtained by BET is x, and the above amount of methylene blue adsorbed (μmol/g) is y, the relationship y≈0.13x holds. This indicates that the larger the specific surface area is, the larger the amount of methylene blue adsorbed is. Therefore, the amount of methylene blue adsorbed can be an indicator replacing the specific surface area.

In the exfoliated graphite-resin composite material according to the first present invention, the ratio y/x is 0.15 or more as described above. In the conventional spherical graphite particles, y≈0.13x. On the other hand, in the present invention, y/x is 0.15 or more, and therefore, the exfoliated graphite-resin composite material according to the first present invention is distinguished from the conventional spherical graphite particles. In other words, the amount of methylene blue adsorbed is larger in the exfoliated graphite-resin composite material according to the present invention than in the conventionally known spherical graphite though the BET specific surface area is the same. This is considered to be because in the exfoliated graphite-resin composite material according to the present invention, condensation occurs to some extent in a dry state, but the distance between graphenes is increased in a wet state such as in methanol compared with in the dry state.

In a second invention in this application, the pyrolysis initiation temperature and pyrolysis end temperature of a resin in an exfoliated graphite-resin composite material are higher than the pyrolysis initiation temperature and pyrolysis end temperature of the resin before composite formation, respectively. In the present invention, the pyrolysis initiation temperature and pyrolysis end temperature refer to TAG measurement-dependent decomposition initiation temperature and decomposition end point temperature, respectively.

In the exfoliated graphite-resin composite materials according to the first and second inventions in this application, not only is the distance between graphenes increased, but the resin forms a composite with the exfoliated graphite. Therefore, the exfoliated graphite-resin composite materials have excellent dispersibility when added to a resin material. Further, when added to a resin, the exfoliated graphite-resin composite material is desirably added in a state of a dispersion in which the exfoliated graphite-resin composite material is dispersed in an organic solvent. In the dispersion, the distance between graphenes is increased, and aggregation can be suppressed. Therefore, even if the amount of the exfoliated graphite-resin composite material added is decreased, the exfoliated graphite-resin composite material can be dispersed much more uniformly in the resin. In addition, the exfoliated graphite-resin composite material is less likely to precipitate in a dispersion or solution, and therefore, the pot life, that is, usable time, of the dispersion or solution can also be increased. Therefore, preferably, the exfoliated graphite-resin composite material according to the present invention is desirably prepared as a dispersion or solution in which the exfoliated graphite-resin composite material is dispersed or dissolved in an organic solvent.

The BET specific surface area of the exfoliated graphite-resin composite material is 25 m$^2$/g or more, preferably 35 m$^2$/g or more, more preferably 45 m$^2$/g or more, and more preferably 100 m$^2$/g or more. The upper limit value of the BET specific surface area of the exfoliated graphite-resin composite material is usually 2500 m$^2$/g or less.

The exfoliated graphite may be one using primary exfoliated graphite as a raw material instead of graphite. The primary exfoliated graphite widely includes, in addition to exfoliated graphite obtained by exfoliating graphite, and the exfoliated graphite-resin composite material of the present invention, exfoliated graphite obtained by exfoliating graphite by various methods described later. The primary exfoliated graphite is obtained by exfoliating graphite, and therefore, its specific surface area is larger than that of graphite.

The resin contained in the exfoliated graphite-resin composite material is preferably a polymer of a radical polymerizable monomer. The resin may be a copolymer of a plurality of types of radical polymerizable monomers or a homopolymer of one type of radical polymerizable monomer. The radical polymerizable monomer is not particularly limited as long as it is a monomer having a radical polymerizable functional group. Examples of the radical polymerizable monomer include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-methylene-δ-valerolactone, α-methylstyrene, α-substituted acrylates comprising α-acetoxystyrene, vinyl monomers having a glycidyl group or a hydroxyl group such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group such as allylamine, diethylaminoethyl (meth)acrylate, and dimethylaminoethyl (meth)acrylate; monomers having a carboxyl group such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethylphthalic acid; monomers having a phosphate group such as Phosmer M, Phosmer CL, Phosmer PE, Phosmer MH, and Phosmer PP manufactured by Uni-Chemical Co., Ltd.; monomers having an alkoxysilyl group such as vinyltrimethoxysilane and 3-methacryloxypropyltrimethoxysilane; and (meth)acrylate-based monomers having an alkyl group, a benzyl group, or the like. Preferred examples of the radical polymerizable monomer include vinyl-based monomers. Particular examples include an inexpensive styrene monomer.

The content of the resin in the exfoliated graphite-resin composite material is preferably 1% by mass to 70% by mass. Thus, by the composite formation of the resin, it is possible to increase dispersibility in a matrix resin or the like much more and increase the distance between graphenes in the edge portion more reliably. The content is more preferably 5% by mass to 30% by mass, further preferably 10% by mass to 20% by mass.

The exfoliated graphite-resin composite material of the present invention is characterized by being relatively less likely to fly. This is considered to be because a polymer obtained by polymerizing the above radical polymerizable monomer is not completely decomposed and is left in a pyrolysis step as described later. In other words, it is considered that the polymer positioned in portions sandwiched between the graphene layers in the exfoliated graphite is sandwiched between the graphenes on both sides and therefore is not completely pyrolyzed around the pyrolysis temperature. Therefore, the exfoliated graphite-resin composite material of the present invention is easily handled.

In addition, in the exfoliated graphite-resin composite material according to the present invention, the interlayer distance between graphenes is increased, and the specific surface area is large. Further, the exfoliated graphite-resin composite material according to the present invention has a graphite structure in the central portion and has an exfoliated structure in the edge portion. Therefore, the exfoliated graphite-resin composite material is more easily handled than conventional exfoliated alloys. In addition, the exfoliated graphite-resin composite material according to the present invention comprises a resin and therefore has high dispersibility in other resins. Particularly, when other resins are resins having a high affinity for the resin contained in the exfoliated graphite-resin composite material, the dispersibility of the exfoliated graphite-resin composite material in the other resins is higher.

Such an exfoliated graphite-resin composite material can be produced, for example, by a production method as described below.

[Method for Producing Exfoliated Graphite-Resin Composite Material]

(Step of Providing Raw Material Composition)

In a method for producing an exfoliated graphite-resin composite material according to the present invention, a composition comprising the above graphite or primary exfoliated graphite and the above polymer, the polymer being fixed to the graphite or primary exfoliated graphite, is provided first. As the step of providing this composition, for example, the following first and second methods in which the polymer is grafted on the graphite or primary exfoliated graphite to fix the polymer to the graphite or primary exfoliated graphite, and a third method in which the polymer is adsorbed on the graphite or primary exfoliated graphite to fix the polymer to the graphite or primary exfoliated graphite can be used.

(First Method)

In the first method, first, a mixture comprising the above graphite or primary exfoliated graphite and the above radical polymerizable monomer is provided as a raw material. Next, the radical polymerizable monomer contained in the mixture is polymerized to form a polymer in which the above radical polymerizable monomer is polymerized in the mixture and graft the polymer on the graphite or primary exfoliated graphite.

In the first method, first, a composition comprising the graphite or primary exfoliated graphite and the radical polymerizable monomer is provided.

The blending ratio between the graphite and the radical polymerizable monomer is not particularly limited and is desirably a proportion of 1:1 to 1:100 in terms of a mass ratio. By setting the blending ratio in a range, it is possible to exfoliate the graphite or primary exfoliated graphite effectively to obtain the exfoliated graphite-resin composite material much more effectively.

In the step of providing the above composition, preferably, a composition further comprising a pyrolyzable foaming agent that generates a gas in pyrolysis is provided. In this case, the graphite or primary exfoliated graphite can be exfoliated much more effectively by heating described later.

The above pyrolyzable foaming agent is not particularly limited as long as it is a compound that decomposes spontaneously by heating and generates a gas during the decomposition. As the above pyrolyzable foaming agent, for example, azocarboxylic acid-based, diazoacetamide-based, azonitrile compound-based, benzenesulfohydrazine-based, or nitroso compound-based foaming agents or the like that generate a nitrogen gas during decomposition, or foaming agents that generate carbon monoxide, carbon dioxide, methane, aldehyde, or the like during decomposition can be used. The above pyrolyzable foaming agent may be used alone, or a plurality of types of foaming agents may be used in combination.

Preferably, as the above pyrolyzable foaming agent, azodicarbonamide (ADCA) having a structure represented by the following formula (1) and foaming agents having structures represented by the following formulas (2) to (4) can be used. These foaming agents decompose spontaneously by heating and generate a nitrogen gas during the decomposition.

[Formula 5]

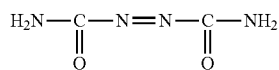

Formula (1)

[Formula 6]

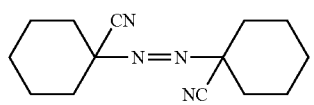

Formula (2)

[Formula 7]

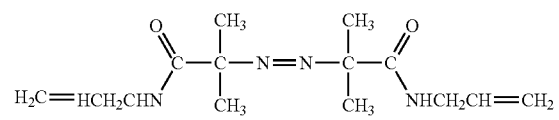

Formula (3)

[Formula 8]

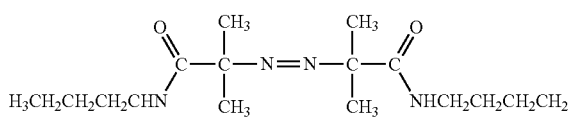

Formula (4)

The pyrolysis temperature of the above pyrolyzable foaming agent is not particularly limited and may be lower or higher than a temperature at which the above radical polymerizable monomer spontaneously initiates polymerization. For example, the pyrolysis temperature of the ADCA having the structure represented by the above formula (1) is 210° C., which is a temperature higher than a temperature at which styrene spontaneously initiates polymerization, 150° C., when the above radical polymerizable monomer is styrene. The pyrolysis initiation temperatures of pyrolyzable foaming agents having the structures represented by the above formulas (2) to (4) are 88° C., 96° C., and 110° C. in order, and these are temperatures lower than the temperature at which styrene spontaneously initiates polymerization, 150° C.

The blending ratio between the above graphite or primary exfoliated graphite and the above pyrolyzable foaming agent is not particularly limited, and 100 parts by weight to 300 parts by weight of the above pyrolyzable foaming agent is preferably blended based on 100 parts by weight of the above graphite or primary exfoliated graphite. By setting the amount of the above pyrolyzable foaming agent blended in the above range, it is possible to exfoliate the above graphite or primary exfoliated graphite much more effectively to obtain the exfoliated graphite-resin composite material effectively.

The method for providing the above composition is not particularly limited. Examples of the method include a method of dispersing the above graphite or primary exfoliated graphite in the above radical polymerizable monomer using the above radical polymerizable monomer as a dispersion medium. In addition, the above composition further comprising the above pyrolyzable foaming agent can be provided by dissolving or dispersing the above pyrolyzable foaming agent in the above radical polymerizable monomer.

Next, the step of polymerizing the above radical polymerizable monomer contained in the above composition to form a polymer in which the above radical polymerizable monomer is polymerized in the above composition is performed.

At this time, the above radical polymerizable monomer forms a free radical, and thus, the above radical polymerizable monomer undergoes radical polymerization, and thus, the polymer in which the above radical polymerizable monomer is polymerized is formed. On the other hand, the graphite contained in the above composition is a stack of a plurality of graphene layers and therefore has radical trapping properties. Therefore, when the above radical polymerizable monomer is subjected to polymerization in the above composition comprising the above graphite or primary exfoliated graphite, the above free radical is adsorbed on the ends and surfaces of the graphene layers of the above graphite or primary exfoliated graphite. Therefore, the above polymer or the above radical polymerizable monomer having the above free radical formed during the polymerization is grafted on the ends and surfaces of the graphene layers of the above graphite or primary exfoliated graphite.

Examples of the method for polymerizing the above radical polymerizable monomer contained in the above composition include a method of heating the above composition to the temperature at which the above radical polymerizable monomer spontaneously initiates polymerization or higher. By heating the above composition to the above temperature or higher, a free radical can be formed in the above radical polymerizable monomer contained in the above composition. Thus, the above-described polymerization and grafting can be performed.

When the above radical polymerizable monomer is polymerized by heating as described above, both the polymerization of the above radical polymerizable monomer and the pyrolysis of the above polymer described later can be performed by simply heating the above composition. Therefore, the exfoliation of the graphite or primary exfoliated graphite is much easier.

The above heating method is not particularly limited as long as it is a method that can heat the above composition to the above temperature or higher. The above composition can be heated by an appropriate method and apparatus. In addition, in the above heating, heating may be performed without sealing, that is, under normal pressure.

In addition, in order to reliably polymerize the above radical polymerizable monomer, after the above composition is heated to a temperature equal to or higher than the temperature at which the above radical polymerizable monomer spontaneously initiates polymerization, the above temperature may be further maintained for a certain time. The time that the above composition is maintained around the above temperature is preferably in the range of 0.5 to 5 hours though depending on the type and amount of the radical polymerizable monomer used.

After the step of forming the above polymer, the step of heating the above composition to the pyrolysis temperature of the above polymer to pyrolyze the above polymer while leaving part of the polymer is performed. Thus, the above polymer contained in the above composition, the above polymer grafted on the ends and surfaces of the graphene layers of the above graphite or primary exfoliated graphite, and the like are pyrolyzed. In the present invention, the pyrolysis temperature of the above polymer refers to TAG measurement-dependent decomposition end point temperature. For example, when the polymer is polystyrene, the pyrolysis temperature of the above polymer is about 350° C.

At this time, when the above polymer grafted on the ends and surfaces of the graphene layers of the above graphite or primary exfoliated graphite, and the like are pyrolyzed, exfoliation force occurs between the above graphene layers. Therefore, by pyrolyzing the above polymer and the like, the above graphite or primary exfoliated graphite can be exfoliated between the graphene layers of the above graphite or primary exfoliated graphite to obtain exfoliated graphite.

In addition, part of the polymer is left in the composition even by this pyrolysis. The pyrolysis initiation temperature and pyrolysis end temperature of the resin in the exfoliated graphite-resin composite material obtained by the pyrolysis are higher than the pyrolysis initiation temperature and pyrolysis end temperature of the resin before the composite formation, respectively.

In the present invention, the exfoliated graphite is a graphene stack after exfoliation obtained by subjecting the original graphite or primary exfoliated graphite to exfoliation treatment, and refers to a graphene stack having a larger specific surface area than the above original graphite or primary exfoliated graphite, or a graphene stack in which the decomposition end point of the original graphite or primary exfoliated graphite shifts to lower temperature.

The above heating method is not particularly limited as long as it is a method that can heat the above composition to the pyrolysis temperature of the above polymer. The above composition can be heated by an appropriate method and apparatus. In addition, in the above heating, heating may be performed without sealing, that is, under normal pressure. Therefore, exfoliated graphite can be produced inexpensively and easily.

Pyrolysis such that the resin is left can be achieved by adjusting the heating time. In other words, by shortening the heating time, the amount of the resin left can be increased. In addition, by lowering the heating temperature, the amount of the resin left can also be increased.

Also in the second method and the third method described later, in the step of heating the above composition so as to leave part of the polymer, the heating temperature and the heating time may be adjusted.

After the above composition is heated to a temperature equal to or higher than the pyrolysis temperature of the above polymer, the above temperature may be further maintained for a certain time, when the above polymer can be pyrolyzed so that part of the polymer is left, while part of the polymer is left in the composition. The time that the above composition is maintained around the above temperature is preferably in the range of 0.5 to 5 hours though depending on the type and amount of the radical polymerizable monomer used.

In addition, when the above radical polymerizable monomer is polymerized by heating in the step of forming the above polymer, heat treatment in the step of forming the above polymer, and heat treatment in the step of pyrolyzing the above polymer described later may be continuously performed by the same method and apparatus.

In the above heating, in a case where the above composition further comprises a pyrolyzable foaming agent, when the above composition is heated to the pyrolysis temperature of the above pyrolyzable foaming agent, the above pyrolyzable foaming agent is pyrolyzed in the above composition. On the other hand, the above pyrolyzable foaming agent generates a gas and foams during pyrolysis. At this time, when the above pyrolyzable foaming agent is pyrolyzed between the graphene layers of the above graphite or primary exfoliated graphite, the above gas generated by the above pyrolysis enters between the above graphene layers, and the space between the above graphene layers is increased. Thus, exfoliation force occurs between the above graphene layers, and therefore, the above graphite or primary exfoliated graphite can be further exfoliated. Therefore, by using the above pyrolyzable foaming agent, the specific surface area of the obtained exfoliated graphite can be increased much more.

In the present invention, by using the above radical polymerizable monomer and/or the above polymer and the above pyrolyzable foaming agent in combination, the graphite or primary exfoliated graphite can be exfoliated much more effectively. The reason why the graphite or primary exfoliated graphite can be exfoliated much more effectively by such a method is not certain, but the following reason is considered. As described above, when the above radical polymerizable monomer forms a free radical, the above polymer or the above radical polymerizable monomer having the above free radical formed during the polymerization is grafted on the ends and surfaces of the graphene layers of the above graphite or primary exfoliated graphite. Therefore, the above free radical is trapped in the graphene layers of the above graphite or primary exfoliated graphite. On the other hand, the above pyrolyzable foaming agent has the property of high affinity for radicals and therefore is attracted to the free radical trapped in the graphene layers of the above graphite or primary exfoliated graphite in the above composition. Therefore, the above pyrolyzable foaming agent is easily pyrolyzed around the stacked surfaces of the graphene sheets of the graphite or primary exfoliated graphite. Therefore, exfoliation force can be effectively applied between the graphene layers of the above graphite or primary exfoliated graphite by the pyrolysis of the above pyrolyzable foaming agent.

The pyrolysis of the above pyrolyzable foaming agent need not necessarily be performed in the step of pyrolyzing the above polymer. For example, when the pyrolysis temperature of the above pyrolyzable foaming agent is lower than the temperature at which the above radical polymerizable monomer spontaneously initiates polymerization, the above pyrolyzable foaming agent may be pyrolyzed when the above radical polymerizable monomer is polymerized by heating in the step of forming the above polymer. In addition, the pyrolysis of the above pyrolyzable foaming agent may be before the polymerization of the radical polymerizable monomer, after the polymerization, or simultaneous with the polymerization.

In addition, in order to reliably pyrolyze the above pyrolyzable foaming agent, after the above composition is heated to a temperature equal to or higher than the pyrolysis temperature of the above pyrolyzable foaming agent, the above temperature may be further maintained for a certain time. The time that the above composition is maintained around the above temperature is preferably in the range of 0.5 to 5 hours though depending on the type and amount of the pyrolyzable foaming agent used.

(Second Method)

In the second method, in the step of providing a composition comprising graphite or primary exfoliated graphite and a polymer in which a radical polymerizable monomer is polymerized, the polymer being grafted on the graphite or primary exfoliated graphite, the polymer is heated to a temperature in the temperature range of 50° C. or higher and 400° C. or lower in the presence of the graphite or primary exfoliated graphite to graft the polymer on the graphite or primary exfoliated graphite. In other words, in the first method, a radical polymerizable monomer is polymerized in the presence of graphite or primary exfoliated graphite to form a polymer and promote the grafting of the polymer on the graphite or primary exfoliated graphite, whereas in the second method, by heating a previously obtained polymer to the above particular temperature range in the presence of graphite or primary exfoliated graphite, a polymer radical formed by pyrolyzing the polymer can be directly grafted on the graphite or primary exfoliated graphite.

As the polymer in the second method, an appropriate pyrolytically radical-forming polymer can be used.

Most organic polymers generate radicals at decomposition temperature. Therefore, as polymers that form radicals around the above decomposition temperature, many organic polymers can be used. However, preferably, polymers of radical polymerizable monomers such as vinyl-based monomers are preferably used. Examples of such vinyl-based monomers, that is, vinyl group-containing monomers, include monomers such as ethyl acrylate, butyl acrylate, 2-ethylhexyl acrylate, and benzyl acrylate. Preferred examples include styrene and glycidyl methacrylate. In addition, examples of polymers obtained by polymerizing the above vinyl group-containing monomers can include alkyl (meth)acrylate esters, polypropylene, polyvinyl phenol, polyphenylene sulfide, and polyphenylene ether.

In addition, polymers containing halogen elements such as chlorine, such as polyvinyl chloride, chlorinated vinyl chloride resins, ethylene fluoride resins, vinylidene fluoride resins, and vinylidene chloride resins, and the like can also be used. Ethylene vinyl acetate copolymers (EVA), polyvinyl acetal, polyvinylpyrrolidone, and copolymers thereof can also be used. Polymers obtained by cationic polymerization such as polyisobutylene and polyalkylene ethers can also be used.

Polyurethanes, epoxy resins, modified silicone resins, silicone resins, and the like obtained by crosslinking oligomers can also be used.

Polyallylamine may be used, and in this case, an amino group can be grafted on the graphite or primary exfoliated graphite. Polyvinyl phenol and polyphenols may be used, and in this case, phenolic OH can be grafted on the graphite or primary exfoliated graphite. In addition, when a polymer having a phosphate group is used, the phosphate group can be grafted.

In addition, condensation polymers such as polyesters and polyamides may be used. In this case, the concentration of radicals obtained at decomposition temperature is low, but decomposition products are grafted.

As the above previously provided polymer, homopolymers of glycidyl methacrylate, polystyrene, polyvinyl acetate, polypropylene glycol, polybutyral, and the like are preferably used. By using these polymers, the graphite or primary exfoliated graphite can be exfoliated much more effectively.

In the second method, the blending ratio between the above graphite or primary exfoliated graphite and the above polymer is not particularly limited and is desirably a proportion of 1:5 to 1:20 in terms of a weight ratio. By setting the blending ratio in this range, it is possible to exfoliate the graphite or primary exfoliated graphite more effectively to obtain the exfoliated graphite-resin composite material effectively.

Also in the second method, as in the case of the first method, in the step of providing the composition, preferably, it is desired to further contain a pyrolyzable foaming agent in the composition. As in the case of the first method, the graphite or primary exfoliated graphite can be exfoliated much more effectively by heating that causes the pyrolysis of the polymer described later.

The pyrolyzable foaming agents that can be used are similar to those in the case of the first method. Therefore, preferably, it is desired to use the foaming agents having the structures represented by formula (1) to (4) described above.

Also in the second method, the blending ratio between the graphite or primary exfoliated graphite and the pyrolyzable foaming agent is not particularly limited, and the pyrolyzable foaming agent is preferably blended in the proportion of 100 to 300 parts by weight based on 100 parts by weight of the graphite or primary exfoliated graphite. When the blending ratio is in this range, the graphite or primary exfoliated graphite can be exfoliated much more effectively.

Also in the second method, the specific method for providing the composition is not limited. Examples of the specific method include a method of introducing the above polymer and graphite or primary exfoliated graphite into an appropriate solvent or dispersion medium and heating the mixture.

The polymer is grafted on the graphite or primary exfoliated graphite by the above heating. This heating temperature is desirably in the range of 50° C. or higher and 400° C. or lower. By setting the heating temperature in this temperature range, the polymer can be effectively grafted on the graphite. Thus, the graphite or primary exfoliated graphite can be exfoliated much more effectively. The reason for this is considered as follows.

By heating the polymer obtained by polymerizing the above radical polymerizable monomer, part of the polymer decomposes, and a radical is trapped in the graphene layers of the graphite or primary exfoliated graphite. Therefore, the polymer is grafted on the graphite or primary exfoliated graphite. Then, when the polymer is decomposed and fired in a heating step described later, large stress is applied to the grafting surface of the polymer where the polymer is grafted on the graphite or primary exfoliated graphite. Therefore, it is considered that exfoliation force acts starting from the grafting point, and the distance between the graphene layers is effectively increased.

(Third Method)

Examples of the third method can include a method of dissolving or dispersing the above graphite and the above polymer in an appropriate solvent. As such a solvent, tetrahydrofuran, methyl ethyl ketone, toluene, ethyl acetate, and the like can be used.

In addition, when the pyrolyzable foaming agent is used, the pyrolyzable foaming agent may be further added and dispersed or dissolved in the above solvent.

In addition, in the third method, as the above composition, a composition in which a polymer is adsorbed on graphite or primary exfoliated graphite is provided in a solvent. The method for adsorbing the polymer on the graphite or primary exfoliated graphite is not particularly limited. The polymer has adsorption properties on graphite, and therefore, a method of mixing the graphite or primary exfoliated graphite with the polymer in the above-described solvent can be used. Preferably, in order to adsorb the polymer on the graphite or primary exfoliated graphite more effectively, ultrasonic treatment is desirably carried out. The ultrasonic treatment method is not particularly limited. For example, a method of irradiation with ultrasonic waves at about 100 W and an oscillation frequency of about 28 kHz using an appropriate ultrasonic treatment apparatus can be used.

In addition, the ultrasonic treatment time is also not particularly limited and may be equal to or more than the time required for the polymer to be adsorbed on the graphite. For example, in order to adsorb polyvinyl acetate on the graphite, the ultrasonic treatment may be preferably maintained for about 30 minutes or 60 minutes, more preferably about 120 minutes.

It is considered that the adsorption of the polymer is due to the interaction of the surface energy of the graphite with the polymer.

(Step of Exfoliating Graphite by Pyrolysis of Polymer)

In all of the above first method, second method, and third method, after the composition is provided as described above, the polymer contained in the composition is pyrolyzed. Thus, the graphite or primary exfoliated graphite is exfoliated while part of the polymer is left, and the exfoliated graphite-resin composite material can be obtained. In order to perform the pyrolysis of the polymer in this case, the above composition may be heated to the pyrolysis temperature of the polymer or higher. More specifically, the above composition is heated to the pyrolysis temperature of the polymer or higher, and the polymer is further fired. At this time, the polymer is fired to the extent that the polymer is left in the composition. Thus, the exfoliated graphite-resin composite material can be obtained. For example, the pyrolysis temperature of polystyrene is about 380° C. to 450° C., the pyrolysis temperature of polyglycidyl methacrylate is about 400° C. to 500° C., and the pyrolysis temperature of polybutyral is about 550° C. to 600° C. in the air.

It is considered that the exfoliated graphite-resin composite material can be obtained by the pyrolysis of the above polymer for the above-described reason, that is, because when the polymer grafted on the graphite is fired, large stress acts on the grafting point, and thus, the distance between the graphenes increases.

In the first method, it has been described that the heating for polymerizing the radical polymerizable monomer and the pyrolysis of the above polymer may be continuously carried out in the same heating step. Also in the second method, the heating step for grafting the above polymer on the graphite or primary exfoliated graphite and the heating step of pyrolyzing the above polymer may be continuously carried out.

Further, it is desired to carry out both the first method and the second method a plurality of times. For example, it is possible to provide a composition by the first method, then pyrolyze the polymer to obtain exfoliated graphite in which substantially no polymer is contained, and then further repeat the first method one or more times using the obtained exfoliated graphite as primary exfoliated graphite that is a raw material in the first method, to obtain an exfoliated graphite-resin composite material having a much larger specific surface area. Similarly, it is possible to provide a composition by the second method, then pyrolyze the polymer to obtain exfoliated graphite in which substantially no polymer is contained, and then further carry out the second method and the pyrolysis of the polymer using the obtained exfoliated graphite as primary exfoliated graphite that is a raw material in the second method, to obtain an exfoliated graphite-resin composite material. Also in these cases, an exfoliated graphite-resin composite material having a much larger specific surface area can be obtained. For example, it is possible to provide a composition by the first method, then pyrolyze the polymer to obtain an exfoliated graphite-resin composite material, and then further repeat the first method one or more times using the obtained exfoliated graphite-resin composite material as primary exfoliated graphite that is a raw material in the first method, to obtain an exfoliated graphite-resin composite material having a much larger specific surface area. Similarly, it is possible to provide a composition by the second method, then pyrolyze the polymer to obtain an exfoliated graphite-resin composite material, and then further carry out the second method and the pyrolysis of the polymer using the obtained exfoliated graphite-resin composite material as primary exfoliated graphite that is a raw material in the second method, to obtain an exfoliated graphite-resin composite material.

Further, it is possible to heat a composition provided by the first method to obtain exfoliated graphite in which substantially no polymer is contained, and then, using the exfoliated graphite as primary exfoliated graphite as a raw material in the second method, subsequently obtain exfoliated graphite as in the second method. On the contrary, it is possible to heat a composition obtained by the second method to obtain exfoliated graphite in which substantially no polymer is contained, then subsequently provide a composition as in the first method using the exfoliated graphite as primary exfoliated graphite that is a raw material in the first method, and further pyrolyze the polymer by heating, to obtain exfoliated graphite. By repeating exfoliation by the production method of the present invention one or more times further using the above exfoliated graphite in which substantially no polymer is contained obtained by pyrolysis, as primary exfoliated graphite as a raw material, in this manner, an exfoliated graphite-resin composite material having a much larger specific surface area can be obtained.

It is possible to heat a composition provided by the first method to obtain an exfoliated graphite-resin composite material, and then, using the exfoliated graphite-resin composite material as primary exfoliated graphite as a raw material in the second method, subsequently obtain an exfoliated graphite-resin composite material as in the second method. On the contrary, it is possible to heat a composition obtained by the second method to obtain an exfoliated graphite-resin composite material, then subsequently provide a composition as in the first method using the exfoliated graphite-resin composite material as primary exfoliated graphite that is a raw material in the first method, and further pyrolyze the polymer by heating, to obtain an exfoliated graphite-resin composite material. By repeating exfoliation by the production method of the present invention one or more times further using an exfoliated graphite-resin composite material as primary exfoliated graphite as a raw material in this manner, an exfoliated graphite-resin composite material having a much larger specific surface area can be obtained.

(Other Modifications)

In the present invention, an exfoliated graphite-resin composite material is obtained by pyrolyzing a polymer in a composition having a structure in which a polymer in which a radical polymerizable monomer is polymerized is grafted on graphite or primary exfoliated graphite, as described above. In the present invention, further, the step of exfoliating graphite may be performed by another method.

For example, another method for exfoliating graphite as conventionally known may be further carried out using an exfoliated graphite-resin composite material as a raw material as described above. Alternatively, the method for producing an exfoliated graphite-resin composite material according to the present invention may be carried out using as a raw material primary exfoliated graphite obtained by another method for exfoliating graphite. Also in these cases, an exfoliated graphite-resin composite material having a much larger specific surface area can be obtained. As such another method for exfoliating graphite, for example, a method for exfoliating graphite by electrochemical treatment, or an adsorption-pyrolysis method can be used.

The present invention will be clarified below by giving specific Examples and Comparative Examples. The present invention is not limited to the following Examples.

EXAMPLE 1

10 g of expanded graphite (manufactured by TOYO TANSO CO., LTD., trade name "PF Powder 8"), 20 g of ADCA having the structure represented by the above formula (1) (manufactured by EIWA CHEMICAL IND. CO., LTD, trade name "AC#R-K3," pyrolysis temperature 210° C.) as a pyrolyzable foaming agent, and 200 g of a styrene monomer (manufactured by Wako Pure Chemical Industries, Ltd.) as a radical polymerizable monomer were mixed to provide a mixture. Next, the above mixture was subjected to ultrasonic treatment at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above styrene monomer was obtained.

Next, the above composition was heated to a temperature of 120° C., maintained for 1 hour, and further maintained at a temperature of 150° C. for 1 hour. Thus, the styrene monomer in the above composition was polymerized.

Next, the above composition was further heated to a temperature of 230° C. and maintained at the temperature of 230° C. for 1 hour. Thus, the above ADCA was pyrolyzed and foamed in the above composition.

Then, the above composition was further heated to a temperature of 430° C. and maintained at the temperature of 430° C. for 2 hours. Thus, the polymer in which the styrene monomer was polymerized in the above composition was pyrolyzed to obtain an exfoliated graphite-resin composite material in which the above graphite was exfoliated.

EXAMPLE 2

1000 mg of expanded graphite (manufactured by TOYO TANSO CO., LTD., trade name "PF Powder 8," BET specific surface area=22 m²/g), 2 g of ADCA having the structure represented by the above formula (1) (manufactured by EIWA CHEMICAL IND. CO., LTD, trade name "AC#R-K3," pyrolysis temperature 210° C.) as a pyrolyzable foaming agent, 10 g of a vinyl acetate polymer (SN-04T, manufactured by DENKA) as a radical polymerizable monomer, and 20 g of tetrahydrofuran were mixed to provide a mixture. Next, the above mixture was subjected to ultrasonic treatment at 100 W and an oscillation frequency of 28 kHz for 120 minutes using an ultrasonic treatment apparatus (manufactured by Honda Electronics Co., Ltd.). Thus, a composition in which the above expanded graphite was dispersed in the above vinyl acetate polymer was obtained.

Next, the above composition was subjected to drying treatment at 80° C. for 2 hours and further heated to a temperature of 110° C. to completely dry the THF solution. The above composition was further maintained at a temperature of 230° C. for 2 hours. Thus, the above ADCA was pyrolyzed and foamed in the above composition.

Then, the above composition was further heated to a temperature of 500° C. and maintained for 2 hours. Thus, the vinyl acetate polymer in the above composition was pyrolyzed to obtain an exfoliated graphite-resin composite material in which the above graphite was exfoliated.

EXAMPLE 3

6 g of expanded graphite (manufactured by TOYO TANSO CO., LTD., trade name "PF Powder 8," BET specific surface area=22 m²/g), 12 g of ADCA having the structure represented by the above formula (1) (manufactured by EIWA CHEMICAL IND. CO., LTD, trade name "AC#R-K3," pyrolysis temperature 210° C.) as a pyrolyzable foaming agent, 120 g of polypropylene glycol PPG, manufactured by Sanyo Chemical Industries, Ltd., product number: SANNIX GP-3000, number average molecular weight=3000), and 120 g of tetrahydrofuran as a solvent were mixed to provide a raw material composition. Next, the raw material composition was irradiated with ultrasonic waves at 100 W and an oscillation frequency of 28 kHz for 2 hours using an ultrasonic treatment apparatus (manufactured by Honda Electronics Co., Ltd.). The polypropylene glycol was adsorbed on the expanded graphite by this ultrasonic treatment. In this manner, a composition in which the polypropylene glycol was adsorbed on the expanded graphite was provided.

After the above ultrasonic irradiation, the above composition was molded by a solution casting method, maintained at a drying temperature of 80° C. for 2 hours, then maintained at a temperature of 110° C. for 1 hour, further maintained at a temperature of 150° C. for 1 hour, and further maintained at a temperature of 230° C. for 2 hours. Thus, the above ADCA was pyrolyzed and foamed in the above composition.

Next, the heating step of maintaining the above composition at a temperature of 450° C. for 1.5 hours was carried out. Thus, the above polypropylene glycol was pyrolyzed to obtain an exfoliated graphite-resin composite material.

REFERENCE EXAMPLE 1

A composition in which expanded graphite was dispersed in a styrene monomer was obtained as in Example 1.

Next, the above composition was heated as in Example 1 to pyrolyze and foam the ADCA in the composition.

Then, the above composition was maintained at a temperature of 450° C. for 2 hours unlike Example 1. Thus, the polymer in which the styrene monomer was polymerized in the composition was pyrolyzed to obtain an exfoliated graphite-resin composite material in which the graphite was exfoliated.

REFERENCE EXAMPLE 2

A composition in which expanded graphite was dispersed in a vinyl acetate polymer was obtained as in Example 2. Next, the ADCA was pyrolyzed and foamed in the composition as in Example 2.

Thereafter, the above composition was heated to a temperature of 500° C. and further maintained for 24 hours.

Thus, the vinyl acetate polymer in the above composition was pyrolyzed to obtain an exfoliated graphite-resin composite material in which the above graphite was exfoliated.

REFERENCE EXAMPLE 3

A composition in which polypropylene glycol was adsorbed on expanded graphite was provided as in Example 3.

As in Example 3, after ultrasonic irradiation, the composition was molded by a solution casting method and further heated to pyrolyze and foam the ADCA in the composition.

Thereafter, the heating step of maintaining the composition at a temperature of 400° C. for 24 hours was carried out in Reference Example 3. Thus, the polypropylene glycol was pyrolyzed to obtain exfoliated graphite.

Evaluation of Examples and Reference Examples

1) TG/DTA Measurement a) A combustion test was performed in which the polymers polymerized or used in Examples 1 to 3 were heated from 30° C. to 1000° C. at a rate of 10° C./min under an air atmosphere. The TG/DTA measurement results under this combustion test are shown in FIGS. 1 to 3.

b) A combustion test was performed in which the exfoliated graphite-resin composite materials obtained by Examples 1 to 3 and Reference Examples 1 to 3 were heated from 30° C. to 1000° C. at a rate of 10° C./min under an air atmosphere. The TG/DTA measurement results under this combustion test are shown in FIGS. 4 to 6 and FIGS. 13 to 15.

From the comparison of FIGS. 1 to 3 with FIGS. 4 to 6, it is found that the pyrolysis initiation temperatures and pyrolysis end temperatures of the resins in the exfoliated graphite-resin composite materials are higher than the pyrolysis initiation temperatures and pyrolysis end temperatures of the resins before composite formation, respectively.

In addition, around 570° C. in all TG curves in FIGS. 4 to 6, inflection points in the above TG curves are seen. Therefore, it is considered that the polymers are left at temperatures lower than the above inflection points.

Further, the decomposition end point temperature of the original expanded graphite in all DTA curves in FIGS. 4 to 6 decreases, and thus, it is considered that exfoliation proceeds as a whole.

In addition, as is clear from FIG. 13 to FIG. 15, it is found that in Reference Examples 1 to 3, the polymers are completely pyrolyzed and are not left.

2) Measurement of BET Specific Surface Area

For the exfoliated graphite-resin composite materials obtained by Examples 1 to 3 and Reference Examples 1 to 3, the BET specific surface area was measured by a specific surface area measuring apparatus ASAP-2000 manufactured by SHIMADZU CORPORATION using a nitrogen gas. The results are shown in the following Table 1.

TABLE 1

| | BET specific surface area (m$^2$/g) |
|---|---|
| Ex. 1 | 59 |
| Ex. 2 | 119 |
| Ex. 3 | 137 |
| Reference Ex. 1 | 37 |
| Reference Ex. 2 | 28 |
| Reference Ex. 3 | 37 |

As is clear from Table 1, it is found that compared with Reference Examples 1 to 3 in which the resin is not left, in Examples 1 to 3, the BET specific surface area can be increased because part of the resin is left. In other words, it is found that the graphite exfoliation effect is increased by decomposition such that part of the resin is left.

3) XRD Measurement

The XRD spectra of the exfoliated graphite-resin composite materials obtained by Examples 1 to 3 are shown in FIGS. 7 to 9.

As is clear from FIGS. 7 to 9, it is found that the crystallization peak intensity of the graphite structure of the original expanded graphite decreases by performing exfoliation treatment.

4) Observation by SEM

The exfoliated graphite-resin composite materials obtained by Examples 1 to 3 were magnified 1000 times and photographed by a scanning electron microscope (SEM), and the thus obtained photographs were observed. The above SEM photographs of the exfoliated graphite-resin composite materials obtained by Examples 1 to 3 are shown in FIGS. 10 to 12.

As is also clear from FIGS. 10 to 12, it is found that exfoliated graphite-resin composite materials that were thin and had a large specific surface area were obtained by the production methods of the Examples according to the present invention.

EXAMPLES 4 to 8

The exfoliated graphite-resin composite material of Example 4 was obtained as in Example 3 with the blending ratio between the components being same and that of Example 3 but except that the total amount was decreased by 20% by weight.

In each of Example 5 to Example 8, the same treatment steps as Example 4 were carried out to obtain an exfoliated graphite-resin composite material as in Example 4. In other words, Examples 5 to 8 correspond to examples in which Example 4 is repeated. However, by increasing the total amount by 20% by weight, actually, the way of being fired varied partially in the firing furnace though the firing temperature and the firing time were the same. In other words, for operational reasons, the firing temperature varied in the range of ±10° C.

EXAMPLES 9 to 12

The exfoliated graphite-resin composite material of Example 9 was obtained as in Example 2 with the blending ratio between the components being same and that of Example 2 but except that the total amount was increased three times by weight.

In addition, in Examples 10 to 12, the same treatment steps as Example 9 were carried out to obtain the exfoliated graphite-resin composite materials of Examples 10 to 12. In other words, Examples 10 to 12 correspond to examples in which Example 9 is repeated. However, by increasing the total amount by 20% by weight, actually, the way of being fired varied partially in the firing furnace though the firing temperature and the firing time were the same. In other words, for operational reasons, the firing temperature varied in the range of ±10° C.

EXAMPLES 13 to 14

In each of Example 13 to Example 14, each step treatment was carried out as in Example 4 except that the firing temperature and firing time in the final step were changed to 400° C. and 10 hours.

For the exfoliated graphite-resin composite materials of Examples 4 to 8, Examples 9 to 12, and Examples 13 and 14, the amount of methylene blue adsorbed was measured by the following procedure.

Measurement of Amount of Methylene Blue Adsorbed

Methanol solutions of methylene blue at concentrations of 10 mg/L, 5.0 mg/L, 2.5 mg/L, and 1.25 mg/L were prepared in volumetric flasks. As the methylene blue, methylene blue that was a special grade reagent manufactured by KANTO CHEMICAL CO., INC. was used. Using an ultraviolet-visible spectrophotometer (product number UV-1600) manufactured by SHIMADZU CORPORATION, the absorbance of the above four types of methylene blue solutions provided was measured, and a calibration curve was prepared.

Next, 0.005 g of the methylene blue was placed in a 50 mL volumetric flask, and methanol was added as a measurement solvent to prepare a 100 mg/L methylene blue solution. This methylene blue solution was diluted 10 times using the measurement solvent to obtain a 10 mg/L methylene blue solution.

A stir bar, a carbon sample to be measured (0.05 to 0.005 g, changed according to the BET value of the sample), and 50 mL of the above 10 mg/L methylene blue solution were added to a 100 mL eggplant flask, and then, the mixture was subjected to ultrasonic treatment for 15 minutes using an ultrasonic cleaning machine. After the carbon sample was dispersed in this manner, the dispersion was stirred in a cooling bath at a temperature of 25° C. for 60 minutes.

After adsorption equilibrium was reached, the carbon sample and the supernatant liquid were separated by centrifugation. The absorbance of the 10 mg/L methylene blue solution that was blank and the absorbance of the above supernatant liquid were measured using the above ultraviolet-visible spectrophotometer.

The difference between the absorbance of the above blank methylene blue solution and the absorbance of the above supernatant liquid, that is, the amount of decrease in absorbance, was calculated. From this amount of decrease in absorbance and the slope of the above-described calibration curve, the amount of decrease in the concentration of the methylene blue solution was obtained. From this amount of decrease in the concentration of the methylene blue solution, the amount of methylene blue adsorbed on the carbon surface was obtained by the following formula.

the amount adsorbed (mol/g)={the amount of decrease in the concentration of the methylene blue solution (g/L)×the volume of the measurement solvent (L)}/{the molecular weight of the methylene blue (g/mol)×the mass of the charged carbon sample (g)}

In addition, the BET specific surface areas of the exfoliated graphite-resin composite materials obtained in the above Examples 4 to 14 were obtained.

Further, the grafting ratios of the resins in the exfoliated graphite-resin composite materials obtained in Examples 4 to 14 were obtained by the following method.

Measurement of Resin Grafting Ratio (%) on Exfoliated Graphite

1 To 10 g of a sample containing a high pressure heating reaction-treated carbon material was dissolved in a 50-fold weight of a good solvent. The solution was subjected to dispersion treatment at 45 kHz and an output of 100 W at normal temperature for 30 minutes using an ultrasonic apparatus.

The obtained solution was filtered using PTFE-T300A090C manufactured by Advantec having a pore diameter of 3 μm while suction was performed using an aspirator. Further, the same amount of a solvent as the amount of the solution was added, the mixture was filtered again, and the polymer unreacted with the graphene was washed and filtered.

The sample on the filter paper was dried in an oven to remove the contained solvent. The amount of the resin left was obtained from TG/DTA measurement results using the sample, and taken as the grafting ratio.

The amount of methylene blue adsorbed obtained as described above, the BET specific surface area, and the resin grafting ratio obtained from the BET specific surface area are shown in the following Table 2.

TABLE 2

| | BET specific surface area (m$^2$/g) | Grafting ratio (%) | Amount adsorbed (μmol/g) |
|---|---|---|---|
| Ex. 4 | 75 | 13 | 44.1 |
| Ex. 5 | 87 | 13 | 43.9 |
| Ex. 6 | 101 | 11 | 53.0 |
| Ex. 7 | 111 | 17 | 46.1 |
| Ex. 8 | 130 | 23 | 71.1 |
| Ex. 9 | 103 | 62 | 55.9 |
| Ex. 10 | 107 | 62 | 47.2 |
| Ex. 11 | 115 | 64 | 45.1 |
| Ex. 12 | 109 | 58 | 71.1 |
| Ex. 13 | 49 | 2 | 15.4 |
| Ex. 14 | 64 | 7 | 18.1 |
| Reference Ex. 4 | 25.4 | 0 | 6.2 |
| Reference Ex. 5 | 113 | 0 | 14.7 |
| Reference Ex. 6 | 800 | 0 | 103.4 |
| Reference Ex. 7 | 1270 | 0 | 170.9 |

In addition, the relationship between the above BET specific surface area and the amount of methylene blue adsorbed is shown in FIG. 16.

In FIG. 16 and FIG. 17, apart from the above Examples 4 to 14, the relationship between the BET specific surface area and the amount of methylene blue adsorbed measured as described above for known carbonaceous materials is shown together. In FIG. 16 and FIG. 17, the point P1 (Reference Example 4) shows the result of spherical graphite (manufactured by The Association of Powder Process Industry and Engineering, JAPAN, product number: RPSA-2). The point P2 (Reference Example 5) shows the result of spherical graphite (manufactured by The Association of Powder Process Industry and Engineering, JAPAN, product number: RPSA-3). The point P3 (Reference Example 6) shows the result of spherical graphite (Lion Corporation, product number: EC-300J, average particle diameter 40 nm). The point P4 (Reference Example 7) shows the result of spherical graphite (Lion Corporation, product number: EC-600JD, average particle diameter 34 nm). In FIG. 16, only the above four points (Reference Examples 4 to 7) are plotted as known graphite materials, but it has been confirmed that also in other known carbonaceous materials, the results are plotted near y=0.13x wherein r$^2$=0.99 shown in FIG. 16 and FIG. 17.

On the other hand, it is found that in the exfoliated graphite-resin composite materials of Examples 4 to 14, the amount of methylene blue adsorbed is considerably larger than y=0.13x as shown in FIG. 16 and FIG. 17. In other words, y>0.13x and y/x is 0.15 or more. When the relationship between y and x in Examples 4 to 14 shown in FIG. 16 and FIG. 17 was obtained, the result y=0.47x wherein r$^2$=0.86 was obtained.

In other words, it is found that in the exfoliated graphite-resin composite materials of the above Examples 4 to 14, the amount of methylene blue adsorbed that is wet-measured is very larger than the BET specific surface area that is dry-measured. Therefore, it is found that when each of the exfoliated graphite-resin composite materials of the above Examples 4 to 14 is added to a resin in a state of a dispersion in which the exfoliated graphite-resin composite material is dispersed in methanol, the dispersibility in the resin can be increased much more.

The invention claimed is:

1. An exfoliated graphite-resin composite material comprising
an exfoliated graphite and
a resin
said exfoliated graphite and said resin forming the exfoliated graphite-resin composite, and
when an amount of methylene blue adsorbed per g of the exfoliated graphite-resin composite material (μmol/g) is y, the amount of methylene blue adsorbed as measured based on a difference between an absorbance of a methanol solution of methylene blue at a concentration of 10 mg/L and an absorbance of a supernatant liquid obtained by introducing the exfoliated graphite-resin composite material into the methanol solution of methylene blue and performing centrifugation, and a BET specific surface area ($m^2/g$) of the exfoliated graphite-resin composite material is x,
a ratio y/x being 0.15 or more, and the BET specific surface area being 25 $m^2/g$ or more, and
said exfoliated graphite-resin composite has a graphite structure in the central portion and has an exfoliated structure in the edge portion.

2. The exfoliated graphite-resin composite material according to claim 1, wherein a content of the resin is 1% by mass to 70% by mass.

3. The exfoliated graphite-resin composite material according to claim 1, wherein the resin is a polymer of a radical polymerizable monomer.

4. The exfoliated graphite-resin composite material according to claim 1, wherein the ratio y/x is 0.27 or more.

5. The exfoliated graphite-resin composite material according to claim 1, wherein the ratio y/x is 0.39 or more.

6. An exfoliated graphite-resin composite material comprising
an exfoliated graphite and
a resin
said exfoliated graphite and said resin forming the exfoliated graphite-resin composite, and
when an amount of methylene blue adsorbed per g of the exfoliated graphite-resin composite material (μmol/g) is y, the amount of methylene blue adsorbed as measured based on a difference between an absorbance of a methanol solution of methylene blue at a concentration of 10 mg/L and an absorbance of a supernatant liquid obtained by introducing the exfoliated graphite-resin composite material into the methanol solution of methylene blue and performing centrifugation, and a BET specific surface area ($m^2/g$) of the exfoliated graphite-resin composite material is x,
a ratio y/x being 0.27 or more, and the BET specific surface area being 25 $m^2/g$ or more.

* * * * *